United States Patent [19]
Marban

[11] 3,772,511
[45] Nov. 13, 1973

[54] REFLECTIVE ILLUSION DEVICE
[76] Inventor: Enrique G. Marban, 4350 W. Ford City Dr., Chicago, Ill. 60652
[22] Filed: Dec. 29, 1971
[21] Appl. No.: 213,588

[52] U.S. Cl.............. 240/10 R, 240/10 S, 240/103
[51] Int. Cl.......................... A47g 33/16, F21p 1/02
[58] Field of Search................. 240/10 R, 10 S, 3.1, 240/103

[56] References Cited
UNITED STATES PATENTS

| | | | |
|---|---|---|---|
| 2,190,283 | 2/1940 | Eckelberg | 240/10 S X |
| 2,817,007 | 12/1957 | Gallagher | 240/10 S X |
| 3,154,361 | 10/1964 | Franke | 240/1.3 X |
| 2,228,691 | 1/1941 | Crosser | 240/10 S X |
| 2,165,900 | 7/1939 | McGuire | 240/103 A |
| 2,310,165 | 2/1943 | Steiner | 240/1.3 |
| 2,441,489 | 5/1948 | Jacobs | 240/1.3 |
| 1,521,610 | 1/1925 | Finesilver | 240/1.3 |

Primary Examiner—Samuel S. Matthews
Assistant Examiner—Monroe H. Hayes
Attorney—Leo Gregory

[57] ABSTRACT

A substantially hemi-spherical reflective device formed as a shell having a light dispersing inner surface comprising a multiplicity of light reflecting ribs arranged to cause a repeated reflection of light rays within the shell and a flickering light source whereby rays of the light create the illusion that the entire interior of the shell is filled with moving lights.

1 Claim, 5 Drawing Figures

PATENTED NOV 13 1973 3,772,511
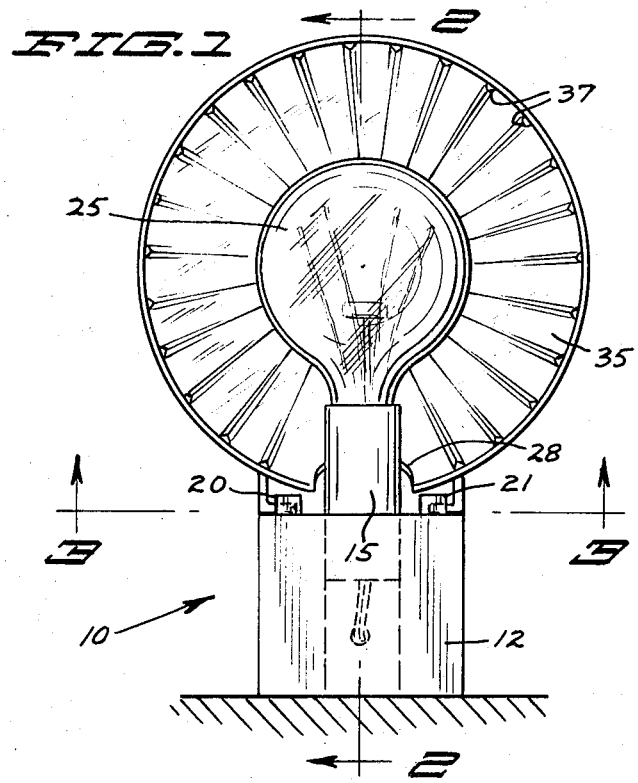
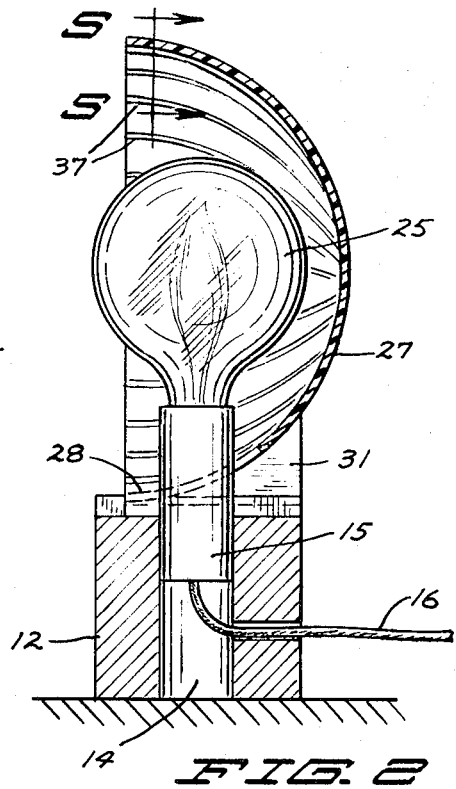
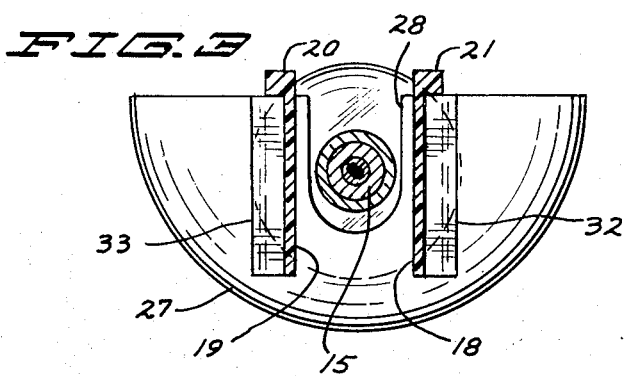
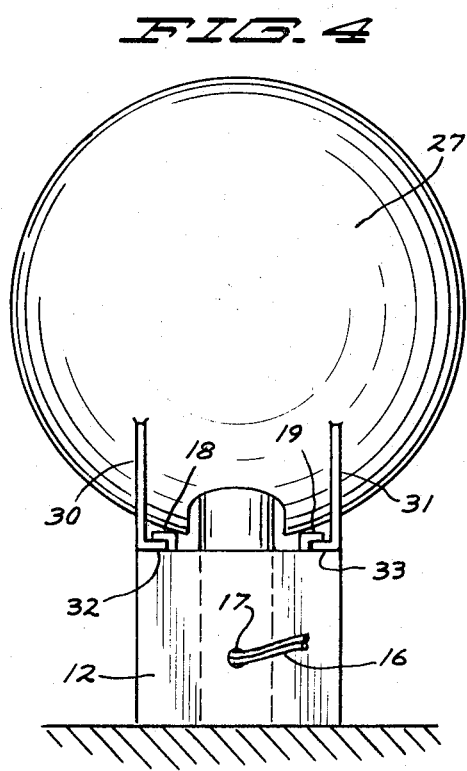
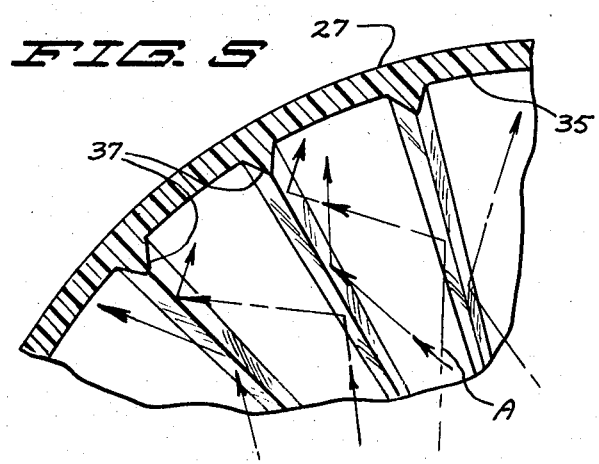

REFLECTIVE ILLUSION DEVICE

BACKGROUND AND SUMMARY OF THE INVENTION

Known in the art are light sources such as electric light bulbs which are arranged to provide a flickering light.

The invention herein represents an improvement in connection with a flickering light source in providing a partial enclosure therefor comprising a light dispersing surface which creates the illusion of said enclosure being filled with moving light.

It is an object of the invention herein, therefore, to provide a reflective device which partially encloses a flickering light source to enhance and make novel the appearance of the flickering light.

It is another object of this invention to provide in connection with a flickering light source therein, means comprising a light dispersing surface partially enclosing said light source and causing the flickering light therein to be reflected repeatedly within said means.

More specifically, the invention herein relates to a flickering light source mounted upon a base having a clamp and a substantially hemi-spherical reflector having means in connection therewith to be secured by said clamp whereby said reflector is partially disposed about said light source and said reflector comprises an inner surface embodying light dispersing means for the repeated reflection within the interior of said reflector of rays of said flickering light to create the illusion that said reflector is filled with moving light.

These and other objects and advantages of the invention will be set forth in the following description made in connection with the accompanying drawings in which like reference characters refer to similar parts throughout the several views and in which:

FIG. 1 is a view of the device herein in front elevation;

FIG. 2 is a view in vertical section taken on line 2—2 of FIG. 1 as indicated;

FIG. 3 is a view in horizontal section taken on line 3—3 of FIG. 1 as indicated;

FIG. 4 is a view in rear elevation with a portion thereof being broken away; and FIG. 5 is a fragmentary view of a detail of structure in section on an enlarged scale taken on line 5—5 of FIG. 2 as indicated.

DESCRIPTION OF A PREFERRED EMBODIMENT

Referring to the drawings, the device herein is indicated generally by the reference numeral 10. Comprising said device is a base portion 12 here shown to be cubic in form and having a central vertical passage 14 circular in horizontal section extending therethrough. Seated within said passage and extended upwardly of said base portion 12 is a conventional type of a light socket 15 having an electric cord 16 extended outwardly of said base 12 as through an accommodating passage 17. Said cord 16 will extend to a convenient source of current and will be appropriately equipped with a conventional terminal. Said socket is suitably held within said passage 14 by being pressure fit therein.

Threaded into said socket and extending upwardly therefrom is an electric bulb 25. There are a number of light bulb structures known in the art which are arranged upon being energized to provide a flickering light on the order of a flame. This is accomplished in various known ways, particular means for which are not a part of the invention herein other than having such a light bulb used in connection with the device herein. The specific means for creating the flickering light is not herein described and is regarded as being conventional and known in the art.

Mounted on the upper surface of said base 12 are clamp members 18 and 19 which taken together form a commonly used shoe type clamp. Said members 18 and 19 are of conventional design comprising right angled members in parallel spaced relation facing outwardly oppositely of each other and being disposed at either side of said socket 15. Carried at the respective forward end portions of the members 18 and 19 are stop members 20 and 21.

In connection with said base portion 12 and said lamp 25 is a reflective means 27 forming a reflective member or reflector which comprises the essential subject matter of the invention herein. Said reflector may be conveniently formed of suitable plastic material, of fiberglass or of glass as may be desired and is here shown to be substantially hemi-spherical in form having an open ended U-shaped slot 28 formed into a peripheral portion thereof. Disposed at either side of said slot and integral with said reflector are a pair of spaced clamp members 30 and 31 integral with said reflector and having lower right angled flange portions angled in the direction toward one another forming clamp portions 32 and 33 to be disposed respectively into said shoe portions 18 and 19. Said reflector is shown in operating position in FIG. 1.

Said reflector in connection with the formation of its interior surface 35 lends an unusual element of novelty taken with the flickering bulb 25. The essential characteristic of said surface is that it forms a very effective light dispersing surface to cause repeated reflection of light rays within said reflector. Such a surface may be variously formed and said surface in the embodiment here illustrated has in connection therewith a multiplicity of radial ribs 37 substantially V-shaped in cross section as indicated in FIG. 5 on a magnified scale. The effect of said ribs in dispersing light rays A is indicated in FIG. 5. The interior surface of said reflector is preferably a highly reflective surface such as a chrome or like surface. As indicated in FIGS. 2 and 3, said reflector will form an enclosure substantially about said bulb 25.

In operation, said cord 16 will be connected to a suitable source of current to energize and illumine the bulb 25 which upon being energized will provide a flickering light source. The rays of said light within said reflector will be reflected repeatedly by the ribbed interior surface of said reflector in rebounding from one interior surface portion to another and said ribs 37 by their transverse configuration create a great multiplicity of said light rays to provide the appearance of dancing or moving light filling the entire interior of said reflector, even to the point of causing the appearance of the light bulb to merge into the light and in effect disappear. Varied effective results are attained by the use of colored light bulbs such as a violet or red bulb.

Thus it is seen that there has been provided through the use of a novel construction of a reflector, a very effective and unusual illusionary effect in connection with a light bulb of the character indicated.

It will of course be understood that various changes may be made in form, details arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A reflective illusion device including an electric light bulb forming a flickering light source having in combination a self standing base member, an electric socket upstanding in said base member and being connected to a current source and having said light bulb disposed therein, a reflective member being substantially hemispherical in form disposed above said light bulb forming an enclosure partially thereabout and having an open ended U-slot in a peripheral portion thereof receiving said socket therein, means slidably removably securing said reflective member to said base portion, and a multiplicity of radial ribs angular in cross section extending from the central portion of said reflective member to the periphery thereof.

* * * * *